United States Patent [19] [11] 3,810,732
Koch [45] May 14, 1974

[54] METHOD AND APPARATUS FOR FLAMELESS COMBUSTION OF GASEOUS OR VAPOROUS FUEL-AIR MIXTURES

[75] Inventor: Christian Koch, Erlangen, Germany

[73] Assignee: Siemens Aktiengesellschaft, Munich, Germany

[22] Filed: June 23, 1972

[21] Appl. No.: 265,689

[30] Foreign Application Priority Data
July 1, 1971  Germany............................ 2132819

[52] U.S. Cl................. 431/7, 126/92 AC, 431/170, 431/328
[51] Int. Cl............................................ F23d 13/16
[58] Field of Search............. 431/7, 12, 2, 170, 320, 431/329; 126/92 AC

[56] References Cited
UNITED STATES PATENTS
| | | | |
|---|---|---|---|
| 3,199,568 | 8/1965 | Baumanns et al. | 431/328 X |
| 2,828,813 | 4/1958 | Holden | 431/170 |
| 1,222,922 | 4/1917 | Bone et al. | 431/7 |
| 3,445,175 | 5/1969 | Krieger | 431/328 |
| 3,188,366 | 6/1965 | Flynn | 431/329 X |

FOREIGN PATENTS OR APPLICATIONS
448,960  6/1948  Canada................................ 431/7

Primary Examiner—Carroll B. Dority, Jr.
Assistant Examiner—William C. Anderson
Attorney, Agent, or Firm—Kenyon & Kenyon Reilly Carr & Chapin

[57] ABSTRACT

Flameless combustion of gaseous or vaporous fuel-air mixtures is accomplished without a catalyst in a perforated sintered block which forms one wall of a mixing chamber. The fuel air mixture is first passed through the perforated sintered block at a relatively low flow rate and burned at the entrance surface of the block until the latter has reached a temperature of approximately 950° C. At that point, the flow rate of the fuel-air mixture is increased by approximately 10 to 50 times to cause the combustion to take place within the perforated sintered block and the temperature of the latter to be increased to approximately 1,000° to 2,000° C.

17 Claims, 5 Drawing Figures

PATENTED MAY 14 1974  3,810,732

METHOD AND APPARATUS FOR FLAMELESS COMBUSTION OF GASEOUS OR VAPOROUS FUEL-AIR MIXTURES

BACKGROUND OF THE INVENTION

This invention relates to a method and apparatus for the flameless combustion of gaseous or vaporous fuel-air mixtures passing through a burner which has at least one perforated sintered block.

Heretofore, it is known to use the radiation heat from solids for heating purposes. In the surface burners of such a system (see "Ullmann's Encyklopaedie der technischen Chemie," 3rd Edition, vol. 1, 1951, p. 187 to 188), an air-saturated fuel-air mixture burns through porous refractory bricks with the bricks becoming incandescent during the process. The flames however are not visible. A drawback associated with these burners is that high surface temperatures cannot be attained, they generally being limited to surface temperatures in the range of 600° to 1,000° C. Another drawback is that combustion without soot cannot be readily achieved.

In the German Published Patent Application 1,939,535, a method for the flameless combustion of gases in porous sintered blocks is described. There, a hydrocarbon-air mixture or a hydrocarbon-oxygen mixture is catalytically burned in a sintered block which is provided with passage holes and contains nickel or platinum. This method, in which gaseous or other hydrocarbons which can be easily evaporated by pre-heating are preferably used, has been well accepted in actual usage. In this system, hydrocarbons which are liquid at room temperature, for instance, benzines, have been found to be particularly suitable. One drawback of this system relates to the impairment of the platinum or nickel catalyst by the liquid fuels which generally contain a greater or lesser amount of catalytic poison, such as sulfur or lead.

SUMMARY OF THE INVENTION

It is an object of the invention to provide an improved process for the flameless combustion of gaseous or vaporous fuel-air mixtures passing through a burner having at least one perforated sintered block in which the shortcomings of the methods known up to now are avoided. In particular, it is an object to provide a process for flameless high-temperature combustion without a catalyst by means of which high combustion temperatures and increased heat transfer are achieved.

According to the invention, this is accomplished by first burning at the entrance of a perforated sintered block a fuel-air mixture with a low flow rate until the block has reached a temperature of approximately 950° C. The flow rate of the mixture is increased ten to fifty times causing the combustion reaction to be pushed into the perforated sintered block with the temperature of the latter being increased to values of between approximately 1,000° and 2,000° C.

Surprisingly, it has been found that at a definite temperature, which the entire perforated sintered block must have, namely, approximately 950° C, flameless combustion takes place in the perforated sintered block, such as has been known heretofore only in catalyst-containing perforated sintered blocks. Beyond this temperature, the loading of the perforated sintered block can be increased many times, with temperatures up to 2,000° C being attainable.

According to the invention, the fuel-air mixture after ignition first burns at the front or entrance surface of the perforated sintered block. When the latter has reached the reaction temperature, about 950° C, which can be recognized by its bright red color, the flow rate of the fuel-air mixture is increased and the flame is pushed into the perforated sintered block. Depending on the composition of the fuel-air mixture, i.e., as a function of the oxygen content, the temperature of the perforated sintered block then adjusts itself to between 1,000° and 2,000° C, with the perforated sintered block displaying a yellow incandescence in the lower portion and white incandescence in the upper portion. In the process, the perforated sintered block gives off heat, mainly by radiation, and also the heat of the combustion gases by convection. The high-temperature combustion, which is possible in the process according to the invention, results in a reduction in the heat exchange surfaces in the burner due to the high combustion temperatures and the increased heat transfer, and therefore results in smaller structural units and, particularly, in a higher operating efficiency of the burner.

A further advantage of the process according to the invention is seen in the fact that the combustion takes place completely without the development of soot. This difference from conventional methods will be explained below by a discussion of the various combustion processes.

Generally, the combustion process can be divided into three phases:

a. heating the fuel and the oxidant, for instance, air;

b. mixing of the two reactants; and c. reaction of the fuel with the oxidant.

The course of the combustion is largely determined by the first two phases; the combustion reaction proper, (c), takes place rather rapidly and therefore does not determine the overall time, nor the type of combustion of a fuel particle. In the combustion process, the fuel cannot be heated to the combustion temperature before entering the mixing of combustion chamber, because it would decompose, forming soot. Therefore, except where pre-heating is used, in conventional burners it is heated to the reaction temperature in the combustion chamber, through the heat radiation of the walls. The fuel enters the combustion chamber, for instance, in the form of droplets and forms zones of different fuel concentration. Due to the heat radiation, the fuel evaporates, while fuel-enriched layers form on the surface of the droplets as the speed of evaporation increases. Due to the lack of an oxidant, the fuel-enriched layers act as a kind of barrier layer, and the centers of the droplet can easily form coke, which leads to the development of soot. The existing heat radiation is usually not sufficient to bring the soot particles up to the combustion temperature.

In contrast to these inadequate conditions in conventional burners, especially in view of the insufficient heat radiation onto the fuel particles, combustion without soot is achieved under the conditions prevailing in the process according to this invention, particularly because of the high temperatures which result in good heating and mixing of the reactants when perforated sintered blocks are used. Intensive mixing of the reactants and intensive heat transfer take place in the perforated sintered blocks used according to the invention. These perforated sintered blocks consist of highly porous material, which is provided with a multiplicity of passage holes arranged parallel to each other. In operation, the fuel-air mixture is pushed into these passage holes at a high flow rate. The heating of the reactants, by heat radiation in the perforated sintered block, and the heat transfer processes during combustion take place primarily in these passage holes. The high radiation coefficient of the material of the perforated sintered blocks and the large radiating surface formed by the highly porous structure, cause rapid heating of the reactants as compared to the processes in conventional burners and, due to the ensuing rapid evaporation of the fuel, result in intimate mixing of the reactants and combustion without soot. It is furthermore an advantage that the reaction heat generated by combustion is radiated in the perforated sintered block freely and locally. The formation of soot and by-products, such as harmful organic compounds, which occurs during incomplete combustion, are avoided as long as the temperature in the perforated sintered block does not drop substantially below 1,000° C, since the combustion reaction then takes place sufficiently fast and completely.

As previously mentioned, the use of highly porous material has, on the one hand, the advantage of providing improved heat radiation to the reactants within the perforated sintered block due to the large surface area. On the other hand, the heat can be retained and localized better in porous materials than in non-porous materials. In addition, the porous material is desirable in the process according to the invention because it is more resistant to high temperatures than non-porous material; the thermal expansion, for instance, rarely results in the destruction of porous material, which in contrast, is not the case with non-porous material.

The described specific combustion process in the passage holes of the perforated sintered block and the advantages achievable thereby are dependent to a high degree on the nature of the perforated sintered block used. Combustion takes place in the passage holes where a high ratio of surface area relative to the volume of the space available exists, and at a short distance from the wall, whereby rapid heating of the reactants to the reaction temperature and intimate mixing are accomplished.

A further advantage of the process according to the invention results from the fact that it is not susceptible to contamination by the fuels used. Thus, materials which act as catalytic poisons have no detrimental effect on the method according to the invention. Trouble due to other impurities which, for instance, can lead to the clogging of fine pores, are prevented by providing holes, i.e., passage openings, of relatively large cross section in the perforated sintered blocks.

In a preferred embodiment of the method of the invention, a fuel-air mixture is used with an oxygen content that is sufficient for complete combustion, i.e., for the complete oxidation of the entire fuel. In this case, the amount of air in the mixture is chosen so that the oxygen is present at least at the stochiometric ratio. It is preferable to use a slight excess of air in order to assure complete oxidation. With complete oxidation, carbon dioxide and water vapor are generated from the fuel, for instance, gasoline or other hydrocarbons.

In the process with complete oxidation, the temperature of the perforated sintered block is increased to about 1,500° to 2,000° C by appropriately raising the flow rate of the mixture. The reaction heat in the burner is here 85 to 170 kJ/hr (about 20 to 40 kcal/hr) per $cm^2$ of surface of the perforated sintered block. The thermal loading of about 85 to 170 $kJ/cm^2.hr$ of the perforated sintered block is an optimum operating condition although it may also be increased to maximum of approximately 420 $kJ/cm^2.hr$ (about 100 $kcal/cm^2.hr$).

By way of an example, in a simple arrangement consisting of a nozzle for spraying the fuel, for instance, gasoline, a blower for supplying the air, and a perforated sintered block with an area of 28 $cm^2$ and a thickness of 1.5 cm, it is possible to attain in the perforated sintered block without preheating the reactants, temperatures of 1,900° to 2,000° C, as measured with a radiation pyrometer. The combustion takes place completely within the perforated sintered block and without the formation of soot; it can also be maintained without difficulty over extended periods of time.

In lieu of air as the oxidant, oxygen can, of course, also be used for the combustion of the fuel in the process according to the invention. In that case, even higher temperatures can be attained in the perforated sintered blocks. This further increase in temperature is, of course, advisable only if suitable refactory materials are used for the perforated sintered blocks, since material problems may be encountered with temperatures above 2,000° C.

In another preferred embodiment of the process according to the invention, one can operate with an air deficiency while the gas leaving the burner is combusted with a further addition of air. When operating with an air deficiency, which hereinafter will be referred to as partial combustion, only part of the available fuel is completely oxidized, and the balance is only partially oxidized to form carbon monoxide and hydrogen. If gasoline or other hydrocarbons are used as fuel, carbon monoxide (CO) and hydrogen ($H_2$) are therefore generated through the partial combustion, in addition to carbon dioxide ($CO_2$) and water ($H_2O$). The advantage of this embodiment, where again combustion takes place without soot, resides in the fact that in addition to the desired heat generated, the fuel used is partially converted into combustible gases.

In the partial combustion of fuel, i.e., in the conversion into a CO- and $H_2$-containing combustible gas, the temperature of the perforated sintered block is preferably brought to 1,000° to 1,100° C after the combustion reaction has been started. The temperature is determined by the oxygen content of the fuel-air mixture. In this embodiment, the reactants may optionally be preheated prior to combustion. The air deficiency may be up to 50 percent. The lower limit for the air deficiency is reached when the temperature drops appreciably below 1,000° C, as then combustion without soot is no longer assured. In the process of partial combustion, the combustion reaction takes place exclusively in the perforated sintered blocks and proceeds entirely without soot.

A further advantage of the process according to the invention resides in the fact that gasoline as well as oil may be used as fuel. The fuel may be in the form of light gasoline and light oil, as well as in the form of heavy gasoline and heavy oil. Moreover, waste gasoline and waste oil may be used. Other liquid hydrocarbon mixtures or individual hydrocarbons such as benzene, and also gaseous fuels such as city gas, natural gas, methane or propane may be used. In general, carbon-containing fuels such as for instance, blast-furnace gas that contains carbon monoxide may be used in the method of the invention, however, fuels containing hydrocarbons are preferred.

The apparatus for carrying out the process of the invention, i.e., a burner, comprises a space which will be referred to as mixing or combustion chamber, and lines connected to the chamber for supplying the fuel and the oxidant, such as air or oxygen. The mixing chamber has a relatively small depth dimension which prevents backfiring of the flame from the perforated sintered block into the mixing chamber. If liquid fuel is used, means for evaporating the fuel may be provided. The fuel can, for instance, be evaporated by heating the feed line or it could be sprayed, for instance, by means of a nozzle. Means for mixing the gaseous or vaporous fuel with the oxidant may also be optionally provided, for instance, in the form of turbulence vanes, which are arranged in the mixing chamber at the opening of the air supply line. The mixing may also take place by spraying the fuel into the air, or by feeding the fuel or the air tengentially into the mixing chamber, whereby turbulence is generated. Finally, means for igniting the fuel-oxidant mixture are provided. An electric glow bulb may serve as the ignition device, or ignition may be effected by means of an ignition spark. Means for pre-heating the air and/or the fuel may optionally be provided. Preheating may be accomplished, for instance, by means of a heat exchanger through which the hot reaction gases are conducted.

For closing off the mixing chamber, at least one perforated sintered block is provided. The perforated sintered block consists of a highly porous material having a high melting point. The perforated sintered blocks preferably consist of aluminum oxide ($Al_2O_3$), magnesium oxide ($MgO$) or zirconium oxide ($ZrO_2$). However, other porous, highly refractory and high-melting materials may also be used, such as for instance, ceramic materials like magnesium aluminum silicate, or mixed oxides. The perforated sintered blocks are provided with a multiplicity of passage openings which are preferably arranged parallel to each other. 40 to 50 passage openings are preferably arranged per $cm^2$ of perforated sintered block surface. The diameter of the passage openings is from about 0.5 to 3 mm, with the preferred diameter being about 1 mm. The thickness of the perforated sintered blocks is in the range of approximately 5 to 50 mm with the preferred thickness about 15 mm. Intensive mixing of the reactants and combustion take place in the passage openings of the perforated sintered block. The passage openings, furthermore, prevent the perforated sintered blocks from clogging and permit use of a high flow rate for the fuel-air mixture and thereby produce a high output of thermal radiation and/or the production of a large quantity of $CO$- and $H_2$-containing gas for further use. The passage openings provide a further advantage in the sense that combustion is accomplished completely without soot.

The total volume of pores in the perforated sintered blocks, i.e., the volume of the material and the volume of the passage openings, should be at least 50 percent by volume, preferably, the volume of the pores is about 65 to 70 percent by volume. The highly-porous material itself has the volume of pores preferably between about 20 and 60 percent by volume.

The choice of materials for the perforated sintered blocks depends primarily on the temperature to which the burner is to be brought.

These and other objects, advantages and features of the invention will become more apparent from the following description taken in conjunction with the accompanying drawings.

DESCRIPTION OF THE PREFERRED EMBODIMENTS

Figure 1:
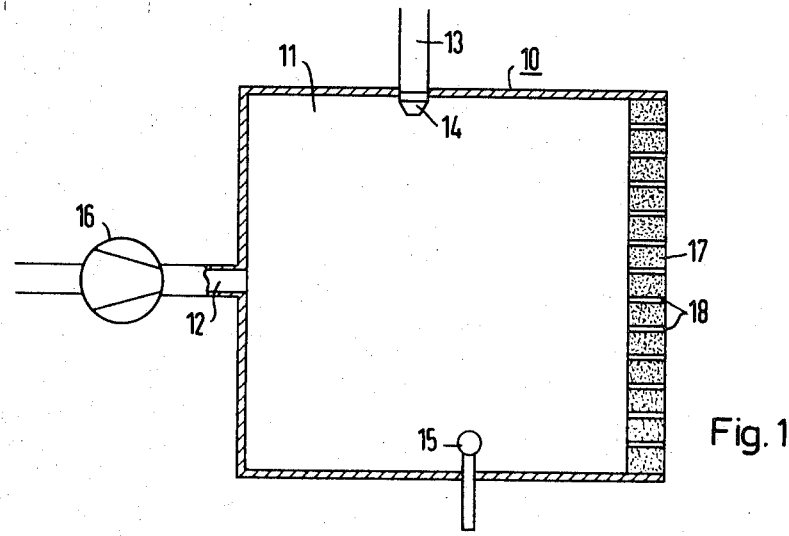
FIG. 1 is a plan view, partly in cross-section, schematically representing the burner of this invention with one perforated sintered block disposed in the mixing chamber.

With reference to the drawings and particularly FIG. 1, the housing of the burner 10 encloses a mixing chamber 11, into which opens a feed line 12 for the air and a feed line 13 for the fuel. The end of the feed line 13 for the fuel is equipped with a nozzle 14 for spraying liquid fuel into the air. The means for feeding the fuel, for instance a pump for liquid fuel or a compressor, such as a blower, for gaseous fuel, as well as the supply tank for the fuel are not shown. At the burner 10 may also be provided several feed lines for the fuel or several nozzles, respectively, which in that case are advantageously arranged in a cyclone configuration so that a vortex is generated when the fuel is brought into the mixing chamber, into which the air is blown. In this case, separate, additional means for mixing the fuel and the air are not necessary.

The mixing chamber 11 is furthermore equipped with a glow plug 15 for igniting the fuel-air mixture. A blower 16 for supplying the air by suction is arranged in the air supply line 12. However, the air can also be supplied, for instance, by means of a compressor. The mixing chamber 11 is bounded on one side by a perforated sintered block 17 which is provided with passage openings 18. If the burner is used to generate radiant heat, it has preferably at least one such perforated sintered block as the termination plate. The radiation is then transmitted by this plate to the environment. However, if the burner serves for pregasification, i.e., for converting fuel into combustible gases (through combustion with a deficiency of air), it has preferably at least two such plates of perforated sintered blocks. The combustible gases generated then leave through the passage openings and are conducted to a post-combustion chamber.

A burner as shown in FIG. 1 has, for example, dimensions of 60 × 120 × 120 mm and the housing is fabricated, for instance, from heat-resistant steel. The mixing chamber is closed off on one side by a perforated sintered block plate having an area of 110 × 110 mm and a thickness of approximately 15 mm; it has a total of about 5,600 passage openings in the form of parallel holes of 1 mm diameter. The perforated sintered block consists of pure aluminum oxide (approximately 99 percent pure) with a porosity of about 30 percent by volume. If 6 kg of Diesel oil are burned per hour in such a burner with sufficient air for complete combustion, about 66 m³/hr of air (under normal conditions, i.e., at a temperature of 0° C and a pressure of 101 325 N/m² or 760 Torr), the perforated sintered block will have a temperature of about 1,800° to 1,900° C. The combustion gases contain essentially carbon dioxide, water vapor and nitrogen.

Figure 2:
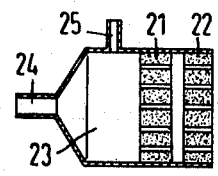
FIG. 2 is a plan view, partly in cross-section of the burner of this invention with two perforated sintered blocks.

FIG. 2 illustrates a burner arrangement for generating a combustible gas with two of the perforated sintered block plates spaced from one another by about 5 mm. If in this burner 6 kg of Diesel oil are burned per hour with a supply of 35 m³/hr of air, a temperature of about 1,000° to 1,100° C is attained in the first perforated sintered block, i.e., in the perforated sintered block that is adjacent the mixing chamber. The combustible gas mixture has a composition of about 7.5 percent $H_2$, 12.5 percent CO, 12.5 percent $H_2O$ and 7.5 percent $CO_2$, with the balance $N_2$.

In both instances, the combustion reaction is started by feeding oil at a feed rate of 0.9 kg/hr and air at a feed rate of 3.3 m³/hr into the mixing chamber and igniting the fuel-air mixture. When the perforated sintered block forming one wall of the mixing chamber reaches a temperature of approximately 950° C, the flow rate of fuel and air is suddenly increased to the required value, resulting in the flame being pushed into the block.

Figure 3:
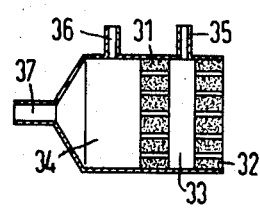
FIG. 3 is a plan view partially in cross-section, of the burner of this invention with two spaced perforated sintered blocks and a fuel line connected to chamber formed therebetween.

As already discussed, in the case of complete combustion, the burner may have one or more perforated sintered blocks. If several perforated sintered blocks are present, the combustion reaction generally takes place in only one perforated sintered block. If the burner has for instance, two perforated sintered blocks 31 and 32, as shown in FIG. 3, starting, i.e., placing the burner in operation, occurs in the following manner: When the first perforated sintered block 31, i.e., the one adjacent to the mixing chamber, has reached a temperature of approximately 950° C, the flow rate of the fuel-air mixture is suddenly increased and the flame is pushed into this perforated sintered block. The heat radiated by the perforated sintered block 31 heats up the second perforated sintered block 32, i.e., the perforated sintered block that terminates the burner. A chamber 33 is formed between the two perforated sintered blocks 31 and 32. Fuel is fed into chamber 33 via a line 35, while line 36 serves to feed chamber 34. Air is fed into mixing chamber 34 via a line 37. When the second perforated sintered block 32 has reached a temperature of approximately 950° C, fuel is introduced into the second chamber 33, for instance, by spraying, and the supply of fuel to the mixing chamber 34 is stopped. In this manner, the combustion reaction which takes place is transported from the first perforated sintered block 31 into the second perforated sintered block 32. In other words, during start-up of the burner, the combustion reaction occurs in the first perforated sintered block, while during operation, in the second one. In the embodiment where two perforated sintered blocks 31 and 32 are used, during operation, air is only supplied to the mixing chamber 34 while the fuel is fed into the chamber 33, which is formed between the two perforated sintered blocks. In this embodiment, the second perforated sintered block, i.e., the one that terminates the burner, during operation serves to carry out the combustion operation and to radiate heat also toward the first perforated sintered block. The temperature of the second perforated sintered block is about 1,500° to 2,000° C during the operation of the burner. The first perforated sintered block, i.e., the one adjacent to the mixing chamber, has its temperature drop after transposing the combustion reaction from the first to the second perforated sintered block into the range of 500° to 800° C, this temperature being maintained by heat radiation from the second perforated sintered block. During operation, the first perforated sintered block serves to pre-heat and distribute the air and also for preventing the fuel in the second chamber from entering the mixing chamber.

As already explained, when only partial combustion is desired the burner may have two or more perforated sintered blocks. If two perforated sintered blocks are utilized such as shown in FIG. 2, the reaction between the fuel and the oxidant takes place in the first perforated sintered block 21, i.e., the one adjacent to the mixing chamber 23. Meanwhile, the second perforated sintered block 22, i.e., the one terminating the burner, serves to reduce the heat radiation of the first perforated sintered block and aids in keeping that block at the required reaction temperature. During operation, the temperature of the first perforated sintered block 21 is approximately in the range of 1,000° to 1,100° C, while the second perforated sintered block 22, which is heated by the hot reaction gases, is at a temperature of about 600° to 800° C. The lines 24 and 25 provide a means for feeding the air and fuel, respectively, to the mixing chamber 23.

Figure 4:
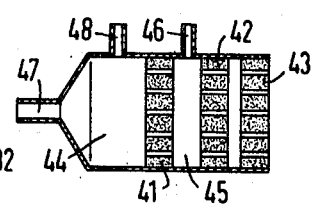
FIG. 4 is a plan view, partly in cross-section, of the burner of this invention with three perforated sintered blocks.

In a further embodiment, which is illustrated in FIG. 4, the burner, which provides for partial combustion, may have three perforated sintered blocks. As in the case of the burner with two perforated sintered blocks, which serves for complete combustion (see FIG. 3), there is arranged between the first two perforated sintered blocks 41 and 42, in addition to the mixing chamber 44, a second chamber 45, into which fuel can be introduced via a line 46. Air and fuel, respectively, are fed to the mixing chamber via the lines 47 and 48. Starting the burner with three perforated sintered blocks for partial combustion proceeds here in the same manner as was already explained in detail for the burner with two perforated sintered blocks for complete combustion (see FIG. 3). During operation, while combustion is taking place in the second perforated sintered block 42, the first perforated sintered block 41 provides for pre-heating and distributing the air as well as preventing the fuel from entering from the second chamber 45 into the mixing chamber 44. The third perforated sintered block 43, which is disposed upstream of the perforated sintered block 42 and terminates the burner, acts to reduce the heat radiation of the perforated sintered block 42, and for maintaining the reaction temperature of the latter in a manner similar to that described with respect to the burner with two perforated sintered blocks used for complete combustion (see FIG. 2). During the operation of the burner, the combustion reaction, wherein only part of the introduced fuel is completely oxidized (partial combustion), therefore takes place exclusively in the middle one

(42) of the three perforated sintered blocks 41 to 43, which are arranged parallel to each other; the air is fed to the mixing chamber 44 ahead of the first perforated sintered block 41, while the fuel is fed to chamber 45, which is arranged between the first (41) and the second perforated sintered block 42.

The burners shown in FIGS. 2 to 4, as well as the burner shown in FIG. 1, are provided with means for igniting the fuel-air mixture, which is however not shown in the drawings. Optionally, means for evaporating or spraying the fuel and for mixing the fuel with the air may be provided.

Figure 5:
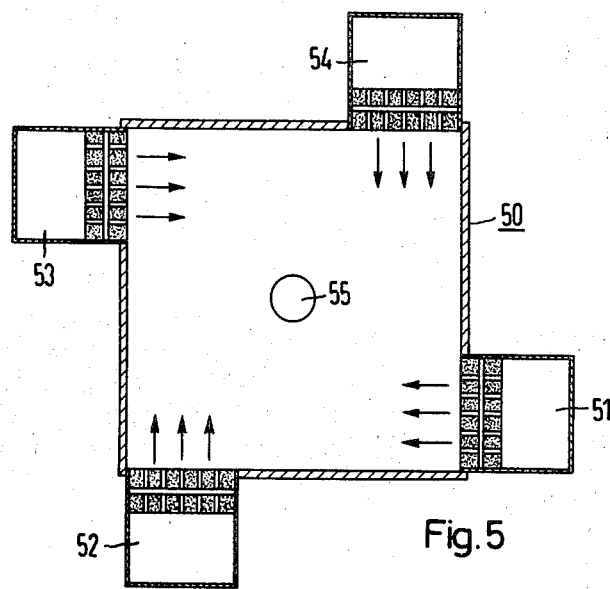
FIG. 5 is a plan view, partially in cross-section, schematically representing a plurality of burners positioned at a post-combustion chamber.

FIG. 5 depicts in a simplified and schematic form, an apparatus for carrying out the process according to the invention, wherein several burners are disposed at a post-combustion chamber. This embodiment may be utilized if complete combustion is not carried out in the burners and combustible gases are generated. The combustible gases are then fed to a post-combustion chamber for further combustion. In the embodiment shown in FIG. 5, this is accomplished by arranging several burners 51, 52, 53 and 54, each having at least two perforated sintered blocks, at a post-combustion chamber 50 in a cyclone configuration, i.e., in a manner such that the combustible gases which leave the burners 51 to 54 in the direction indicated by arrows form a vortex in the post-combustion chamber 50. Into this vortex, air is then centrally blown, for instance, through an opening 55. The air is preferably blown into the post-combustion chamber from below. The perforated sintered block plates are preferably composed of several perforated sintered blocks. The individual perforated sintered block plates may, for instance, have an area of up to 1 m².

The embodiment of FIG. 5 is particularly suited for use in power plant burners. The arrangement and manner of operation is considered as particularly well suited for such an application One advantage is that the apparatus for carrying out the process according to the invention can be operated with a variety of fuels such as for instance, heavy oils, as already mentioned.

Although the above description is directed to a preferred embodiment of the invention, it is noted that other variations and modifications will be apparent to those skilled in the art and, therefore, may be made without departing from the spirit and scope of the present disclosure.

What is claimed is:

1. A method of effecting the flameless combustion of a fuel-air mixture without a catalyst in a burner which has at least one perforated sintered block comprising the steps of passing the fuel-air mixture through the perforated sintered block at a relatively low flow rate, burning at the entrance surface of the perforated sintered block the fuel-air mixture being passed therethrough at a low flow rate, until the perforated sintered block has reached a temperature of approximately 950° C., increasing the flow rate of the fuel-air mixture by approximately 10 to 50 times causing the combustion to take place within the perforated sintered block and the temperature of the latter to be increased to approximately 1,000° to 2,000° C.

2. The method of claim 1 wherein the fuel-air mixture is provided with an oxygen content sufficient to allow substantially complete combustion.

3. The method of claim 1 wherein the reaction heat generated is between 20 and 100 kcal/hr for each square centimeter of sintered block surface.

4. The method of claim 1 wherein the temperature of the perforated sintered block is increased to approximately 1,500° to 2,000° C.

5. The method of claim 1 wherein the combustion reaction takes place with a deficiency of air and further includes the step of burning the gas leaving the sintered block with an additional supply of air.

6. The method of claim 1 wherein the fuel-air mixture includes a hydrocarbon as the fuel.

7. The method of claim 1 wherein the burner is provided with at least two perforated sintered blocks arranged in tandem in the direction of flow of the fuel-air mixture and which further includes the steps of burning the mixture in the first of the perforated sintered blocks, radiating heat from the first perforated sintered block to the second perforated sintered block until it is heated to approximately 950° C, feeding the fuel-air mixture formed between the two perforated sintered blocks while the increased flow rate is maintained so that the combustion reaction is transferred from the first to the second perforated block.

8. The method of claim 7 wherein the fuel-air mixture is provided with an oxygen content sufficient to allow substantially complete combustion.

9. The method of claim 7 wherein the reaction heat generated is between 20 and 100 kcal/hr for each square centimeter of sintered block surface.

10. The method of claim 7 wherein the temperature of the perforated sintered block is increased to approximately 1,500° to 2,000° C.

11. The method of claim 7 wherein the combustion reaction takes place with a deficiency of air and further includes the step of burning the gas leaving the second perforated sintered block with an additional supply of air.

12. The method of claim 7 wherein the fuel-air mixture includes a hydrocarbon as the fuel.

13. An apparatus for effecting the flameless combustion of fuel-air mixtures without a catalyst which comprises a housing which has a mixing chamber formed therewithin, means for feeding air and fuel to said mixing chamber, means for igniting the fuel-air mixture, a perforated sintered block forming at least a portion of the enclosure for said mixing chamber and which is formed of a highly porous material having a high melting point and which is provided with a plurality of passage openings, and a second perforated sintered block arranged in tandem in the direction of flow of the air-fuel mixture with the other of said perforated sintered blocks.

14. An apparatus in accordance with claim 13 which further includes means for evaporating or spraying the fuel and means for mixing the fuel and air, and wherein said plurality of passages in said perforated sintered block are disposed parallel to one another.

15. An apparatus in accordance with claim 13 wherein said first and second perforated sintered blocks are spaced from one another to form therebetween a second chamber and which includes a means for feeding fuel to said second chamber.

16. An apparatus according to claim 15 which includes a plurality of mixing chambers disposed at a post-combustion station in such a manner that the gases discharged from said perforated sintered blocks are directed to form a vortex and which further includes means for blowing air into the vortex for post-combustion.

17. An apparatus in accordance with claim 13 wherein said perforated sintered block is formed of a metal oxide selected from the group of aluminum oxide, magnesium oxide or zirconium oxide.

* * * * *

UNITED STATES PATENT OFFICE
CERTIFICATE OF CORRECTION

Patent No. 3,810,732   Dated May 14, 1974

Inventor(s) Christian Koch

It is certified that error appears in the above-identified patent and that said Letters Patent are hereby corrected as shown below:

In column 1, line 51, change "at the entrance of" to ---at the entrance surface of--

In column 2, line 41, change "mixi ng of combustion " to --mixing or combustion--

In column 5, line 23, change "tengentially" to --tangentially--

In column 7, line 60, change "transported" to --transposed--

Signed and sealed this 3rd day of December 1974.

(SEAL)
Attest:

McCOY M. GIBSON JR.
Attesting Officer

C. MARSHALL DANN
Commissioner of Patents